(12) United States Patent
Bishop et al.

(10) Patent No.: US 7,662,240 B2
(45) Date of Patent: Feb. 16, 2010

(54) SEAL FOR WORM GEAR SPEED REDUCER

(75) Inventors: Geoffrey Bishop, Hartville, OH (US);
Carl Ribaudo, Jackson Township, Stark County, OH (US); Ryan Evans, Jackson Township, Stark County, OH (US);
Richard Borowski, Canton, OH (US)

(73) Assignee: The Timken Company, Canton, OH (US)

( * ) Notice: Subject to any disclaimer, the term of this patent is extended or adjusted under 35 U.S.C. 154(b) by 744 days.

(21) Appl. No.: 10/874,100

(22) Filed: Jun. 22, 2004

(65) Prior Publication Data
US 2006/0000302 A1 Jan. 5, 2006

(51) Int. Cl.
*C23C 22/00* (2006.01)
*F16H 1/16* (2006.01)

(52) U.S. Cl. .......................... 148/220; 74/425
(58) Field of Classification Search ................. 148/220; 74/425
See application file for complete search history.

(56) References Cited

U.S. PATENT DOCUMENTS

| | | | |
|---|---|---|---|
| 2,207,289 A | | 7/1940 | Fleischmann |
| 3,368,263 A | | 2/1968 | Harris, Jr. |
| 4,692,305 A | | 9/1987 | Rangaswamy et al. |
| 4,697,476 A | * | 10/1987 | Maxwell ...................... 475/333 |
| 4,851,267 A | | 7/1989 | Miyauchi et al. |
| 4,946,747 A | | 8/1990 | Bergmann et al. |
| 5,019,182 A | * | 5/1991 | Arimi .......................... 148/219 |
| 5,158,629 A | | 10/1992 | Zobbi |
| 5,186,068 A | * | 2/1993 | Heller .......................... 74/425 |
| 5,279,174 A | | 1/1994 | Minegishi |
| 5,404,060 A | * | 4/1995 | Nakahashi et al. ............. 310/83 |
| 5,595,613 A | * | 1/1997 | Hatano et al. ................ 148/319 |
| 6,151,778 A | | 11/2000 | Woolf et al. |
| 6,309,475 B1 | | 10/2001 | Takayama et al. |
| 6,315,646 B1 | * | 11/2001 | Hoyashita .................... 451/65 |
| 2005/0011748 A1 | | 1/2005 | Beck et al. |

FOREIGN PATENT DOCUMENTS

| | | |
|---|---|---|
| DE | 120056 | 3/1975 |
| DE | 3713920 | 9/1988 |
| DE | 10141696 | 3/2003 |
| GB | 567281 | 2/1945 |
| GB | 607808 | 9/1948 |
| GB | 1221321 | 2/1968 |

OTHER PUBLICATIONS

Voronenko, B. I., Romatovskii, Yu. I., Metallovedenie i Termicheskaya Obrabotka Metallov: Bainitic High-Strength Cast Iron With Spheroidal Graphite, Oct. 1991, No. 10, pp. 28-34.*
Davis, Joseph R. et al., ASM Metals Handbook, Materials Park, Ohio, Heat Treating: Quenching of Steel, vol. 4, Mar. 1990, pp. 88-89.*
Davis, Joseph R. et al., ASM Metals Handbook, Materials Park, Ohio, Heat Treating: Vacuum Carburizing, vol. 4, Mar. 1990, pp. 348-351.*
Davis, Joseph R. et al., ASM Metals Handbook, Materials Park, Ohio, Heat Treating: Gas Carburizing, vol. 4, Mar. 1990, pp. 312-314.*
Davis, Joseph R. et al., ASM Metals Handbook, Materials Park, Ohio, Heat Treating: Carbonitriding, vol. 4, Mar. 1990, pp. 376-377.*
Von Fritz Brautigam, Remscheid—"Oberflächenhärten von Schnecken für Schneckengetriebe"—Werkstatt und Betrieb 107 (1974) 10—pp. 619-620.
CR SEALS Catalog 457010 24A & 25A—"The Shaft Requirements", pp. 24A-25A.
"Innovative Applications of Induction Heat Treating"; Advanced Materials & Processes 5/95;pp. 40S-40V.
SKT.com website; "Suggestions for seal selection and installation" (Oct. 19, 2002) 18 pages.
International Search Report (6 pages) and Written Opinion (7 pages) from corresponding Int'l App. No. PCT/US2005/021075.

* cited by examiner

*Primary Examiner*—Roy King
*Assistant Examiner*—Jessee R. Roe
(74) *Attorney, Agent, or Firm*—Polster, Lieder, Woodruff & Lucchesi L.C.

(57) ABSTRACT

The performance of a worm assembly seal is improved by (1) the use of a hardened steel worm with a bronze worm gear; (2) a tribological coating on one or both of the worm thread or spiral and the gear teeth; 3) a tribological coating on one or both of the input or output shaft or shaft sleeves; or (4) a tribological coating applied to the worm thread, the gear teeth, the input and output shafts or shaft sleeves, or combinations thereof. In each of the approaches, the worm, worm gear, and input and output shafts or shaft sleeves can have surface finishing treatments. Additionally, in each of the three approaches, carbon or carbon/nitrogen concentration gradients can be added to the worm.

32 Claims, 2 Drawing Sheets

SEAL FOR WORM GEAR SPEED REDUCER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to worm-gear speed reducer assemblies, and, in particular, to an improved seal for the speed reducer's shafts.

The relative commercial usefulness of worm gear systems is based in part upon the ability for the gearbox seals to prohibit the egress of lubricants; the ability for the gearbox seals to prohibit the ingress of debris contaminants; the ability for the gearbox seals to minimize heat generation; and the ability for the gearbox seals to minimize wear of the seal itself and/or its mating shaft. Hence, the seals of worm gearboxes play an important part in the commercial usefulness of worm gear systems.

However, currently seals for worm gearboxes have a much lower life than any other gearbox component. Lubricant leaking indicates seal failure. Leaking lubricants into the environment is generally unacceptable and replacing seals is time consuming and costly. Debris tends to scratch and damage the seal elastomer and/or abrade and wear the shaft or shaft sleeve. The seals are also adversely affected by chemical reactions with the lubricant, by wear imposed by contact with the shaft or shaft sleeve, and by heat that can embrittle the elastomer. The seal is likely to be replaced one or more times over the useful lifetime of the gearbox.

BRIEF SUMMARY OF THE INVENTION

A worm gear assembly comprises a worm having a worm shaft and a spiral thread, a worm gear having worm gear teeth, and a worm shaft extending from the center of the worm gear. The worm spiral and the worm gear are contained within a housing in a meshing relationship. The worm and gear shafts extend from the housing and are supported in walls of the housing by bearings. Seals at the housing wall extend between an opening in the worm gear housing and the worm and gear shafts, such that the seals surround the worm and near shafts. The seals prevent the egress of lubricant and the ingress of debris. A seal-shaft interface is formed where the seals contact the worm and gear shafts or shaft sleeves. We have found that the seal performance can be enhanced (i.e., the useful life of the seal can be increased) by (1) the use of a hardened steel worm with a bronze worm gear; (2) the use of a hardened steel worm and a bronze worm gear with a tribological coating on one or both of the worm thread or spiral and the gear teeth; 3) the use of a hardened steel worm and a bronze worm gear with a tribological coating on one or both of the input or output shaft or shaft sleeves; or (4) the use of a hardened steel worm with a bronze worm gear with a tribological coating applied to the worm thread, the gear teeth, the input and output shafts or shaft sleeves, or combinations thereof. In each of the approaches, the worm, worm gear, and input and output shafts or shaft sleeves can have surface finishing treatments. Additionally, in each of the approaches, carbon or carbon/nitrogen concentration gradients can be added to the worm.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
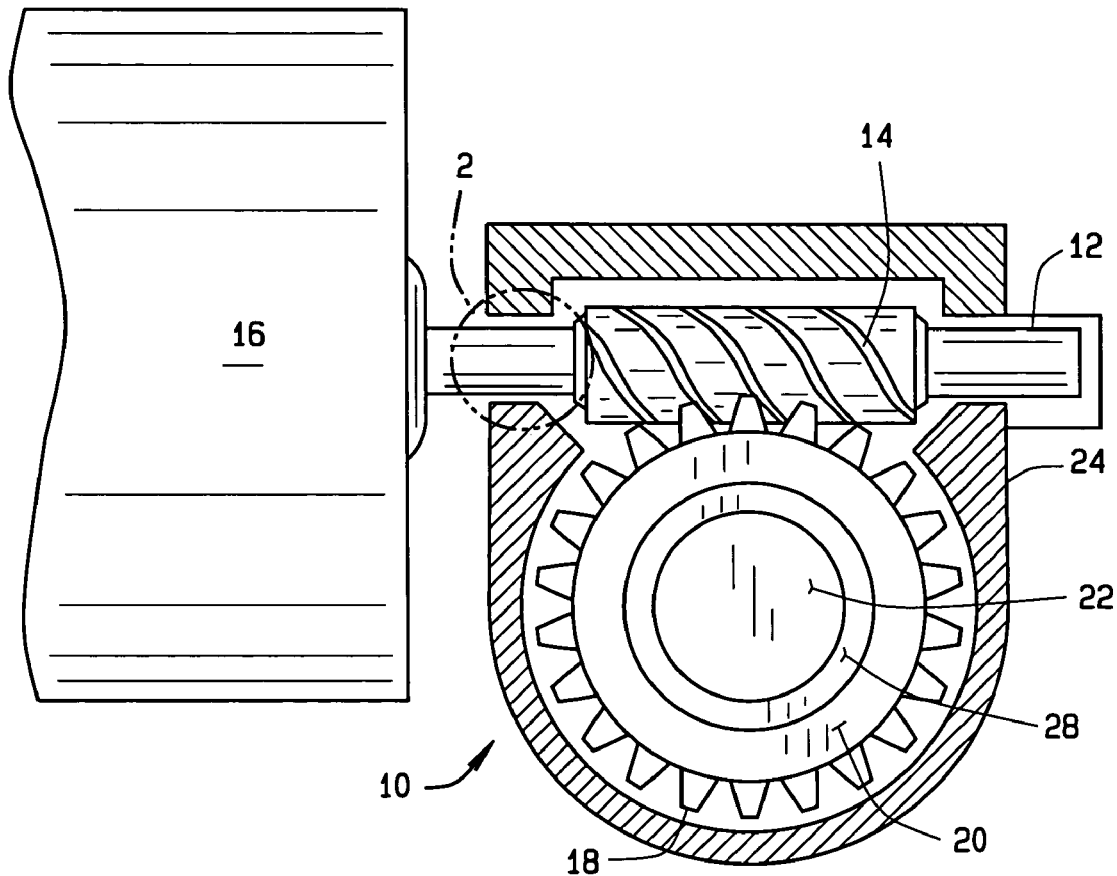
FIG. 1 is a cross-sectional view of a speed-reducer assembly including seals of the present invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

A worm assembly 10 is shown generally in FIG. 1. The worm assembly includes a worm input shaft 12 having a spiraling worm thread 14 formed thereon. The input shaft 12 is connected to a prime mover or drive 16, such as a motor. The worm thread 14 meshes with the teeth 18 of a worm gear or wheel 20. An output shaft 22 extends from the center of the worm gear 20 to be rotated by the worm gear. The worm input shaft 12 and the worm gear 20 are contained within a housing 24, and the input and output shafts extend from the housing to be connected to a driver 16 and a driven element (not shown). Although the driver 16 is shown being connected to the worm input shaft 12, it could alternatively be connected to the worm gear 20 via the worm gear shaft 22, such that the worm gear 20 drives the worm shaft 12.

Figure 2:
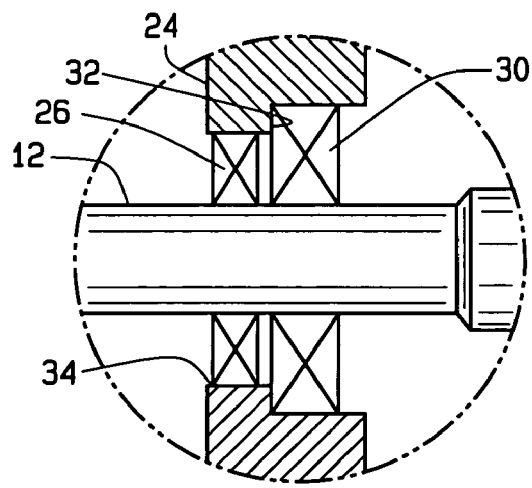
FIG. 2 is an enlarged cross-sectional view taken along circle 2 of FIG. 1 showing the seals in greater detail.
Figure 3A:
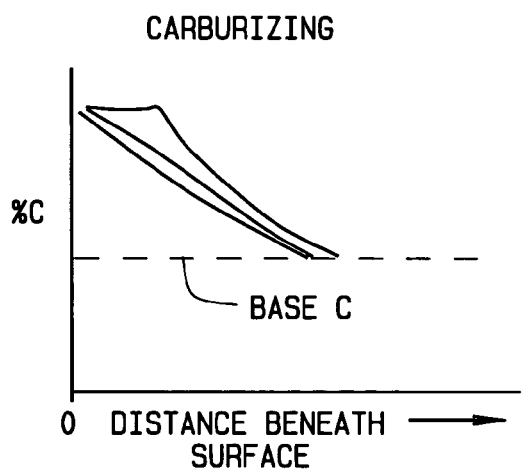
FIGS. 3a-d are graphs showing illustrative profiles of carbon and nitrogen profile of worms of the present invention when carburized (FIG. 3a), nitrided (FIG. 3b), carbonitrided (FIG. 3c), and nitrocarburized (FIG. 3d). The illustrative profiles are not to scale.
Figure 3B:
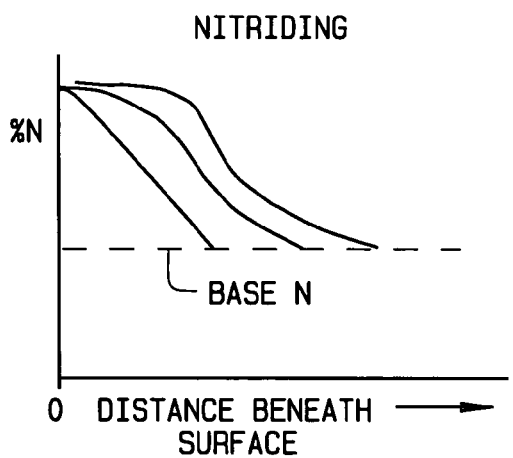
Figure 3C:
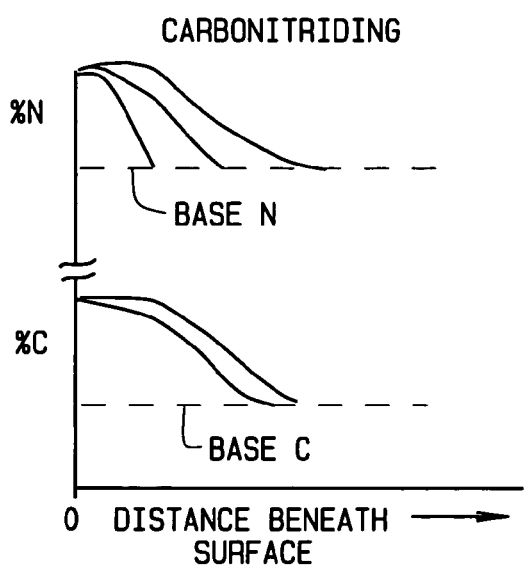
Figure 3D:
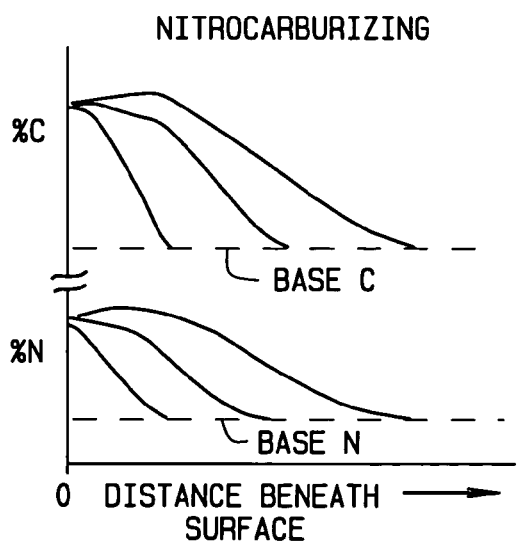

The input shaft 12 and output shaft 22 are sealed via seals 26 and 28, respectively. As best seen in the enlarged view of FIG. 2, the seal 26 is positioned exteriorly of the input shaft bearing 30 which supports the input shaft 12. The bearing 30 is received in a bearing seat 32 in the housing which surrounds an opening 34 through which the shaft 12 extends. The output shaft is supported by a bearing (not shown) as well. The seal 26 extends between the surface defining the opening 34 and the shaft 12 and is an elastomeric seal.

The useful life of the worm gear box can be increased by enhancing the seal performance. Seal performance can be improved by selecting optimal materials, finishes, and/or coating selections for the worm, worm gear, shaft, and/or shaft sleeves. The selection of optimal materials, finishes and/or coatings results in increased seal life; less seal heat generation; lower torque and power losses; and less seal leakage. This occurs by reducing friction and by preventing debris formation caused by adhesive and/or abrasive wear of the worm and gear; reducing the frictional heat generation in the worm/worm gear mesh; reducing the frictional heat generation in the seal interface; and reducing seal and shaft or sleeve wear caused by contact with each other or a third body contaminant.

One method to improve seal performance is to employ a hardened steel worm with a smooth, non-directional surface topography operating against a standard bronze worm gear. The topographically enhanced worm would minimize debris formation by minimizing solid-solid adhesive interactions between the worm and worm gear. Such a configuration would promote low mesh frictional losses, possibly allowing the use of a lower viscosity lubricant. Reducing the amount of debris in the lubricant and the heat generation from the mesh frictional losses would reduce the amount of seal wear, thus reducing seal leakage and extending seal life.

The steel used for the worm can be hardened by a sequence of heating to produce austenite. Preferably, the heating sequence produces at least 50% austenite in the steel. The worm can be heated in a furnace or by a laser, electron beam, magnetic induction or visible light. After heating, the steel can be quenched and tempered. The heated parts can be quenched in a hydrocarbon based or aqueous based liquid, air, partial vacuum or gas. Selections of the heating time and temperature, quenching media selection, and tempering time and temperature are based upon the steel composition and values of the desired properties such as hardness and toughness. In one example, the worm would be made from wrought AISI/SAE type 4140 steel. The steel would be austenitized at about 1575° F. (about 855° C.) for at least about one (1) hour, quenched into oil, and then tempered for about two hours at about 400° F. (about 204° C.) to produce a hardness of approximately 50 HRC throughout the part. The worm could also be made of different types of steel and/or be heat treated in other manners.

Carbon gradients or carbon and nitrogen gradients can be developed on the spiral threads of the worm. The shaft may also be allowed to develop carbon or carbon and nitrogen gradients as well, or masked-off to prevent formation of these gradients. Carbon concentration gradients can be formed by carburizing the worm. The carburizing can be performed by gaseous carburizing, vacuum carburizing, ion carburizing, or pack carburizing. After carburizing, a nitrogen concentration gradient can be developed in the worm using gaseous nitriding, vacuum nitriding, ion nitriding or salt bath nitriding. Alternatively, carbon and nitrogen concentration gradients can be formed concurrently within the worm via carbonitriding or nitrocarburizing of the worm. Carbonitriding can be performed using gaseous carbonitriding, vacuum carbonitriding, ion carbonitriding, or pack carbonitriding. Nitrocarburizing can be performed using gaseous nitrocarburizing, vacuum nitrocarburizing, ion nitrocarburizing or salt bath nitrocarburizing. The concentration of Carbon and/or Nitrogen would be maximized at the surface. The concentration(s) would decrease with increasing distance from the surface. A portion of the worm, including the center, would have the original composition. Illustrative carbon and nitrogen gradient profiles are shown in FIGS. 3a-d. The profiles shown are not to scale and are illustrative only. That is, the actual profile may vary from the profiles shown in the graphs of FIGS. 3a-d.

In one example, the worm would be made from wrought AISI/SAE type 8620 steel. The steel would be carburized in a furnace with a carbon-containing gas mixture such as methane and nitrogen at a temperature of about 1700° F. (about 925° C.) for about six (6) hours; reduced in temperature to about 1550° F. (about 845° C.) while reducing the carbon potential; and then quenched in oil and tempered at about 350° F. (about 177° C.) for about two (2) hours to produce a surface hardness of approximately 60 HRC. The hardness would decrease with increasing distance from the surface until reaching an essentially constant value of approximately 30 to 45 HRC. The carbon content would decrease from $\geq 0.70$ wt % C near the surface with increasing distance from the surface until reaching an essentially constant value of approximately 0.20 wt % C.

In another example, the worm would be made from wrought AISI/SAE 4140 steel. The steel would be austenitized at about 1575° F. (about 855° C.) for at least about one (1) hour; then quenched in oil and tempered for about two (2) hours at 1100° F. (about 595° C.) for about twenty-four (24) hours to produce a surface hardness of approximately 700 HKN (or about 60 HRC). The hardness would decrease with increasing distance from the surface until reaching an essentially constant value of approximately 30 HRC.

In yet another example, the worm would be made from wrought AISI/SAE 4140 steel. The steel would be austenitized at about 1575° F. (about 855° C.) for at least about one (1) hour; then quenched into oil and tempered for about two (2) hours at 1100° F. (about 595° C.) to produce a surface hardness of approximately 29 HRC. The worm would then be nitrocarburized by immersion in a carbon and nitrogen containing salt bath at a temperature of approximately 1050° F. (about 525° C.) for about five (5) hours to produce a surface hardness equivalent to approximately 60 HRC. The hardness would decrease with increasing distance from the surface until reaching an essentially constant value of approximately 29 HRC.

The above examples are illustrative only. The worm can be made from other types of steel and can be carburized, nitrocarburized, or carbonitrided in other manners.

One method for enhancing the surface texture on the worm could be vibratory finishing. Other methods of providing the optimal surface texture on the worm include hard turning, honing, grinding, and rolling. Combinations of the noted texturing methods can also be used to enhance the surface texture of the worm.

It should be noted that the portion of the shaft or shaft sleeve that contacts the seal may be need to be prevented from being topographically modified. The seal contacting area is typically plunge ground to less than or equal to 20 microinch arithmetical average surface roughness or Ra without a continuous helical pattern (lead) or directionality. Topographical modification could reduce the surface roughness below the minimum limit and could eliminate the desirable surface finish pattern from grinding. Hence, preferably, the input and output shafts or shaft sleeves are not topographically modified in the vicinity of where the seal will contact the shafts.

Another approach for improving seal performance would be to employ a standard bronze worm gear and a worm made from hardened steel which is topographically enhanced and has a tribological coating applied thereto. The coating can be applied only to the shaft or to both the spiral thread (teeth) and shaft. This second approach adds to the first approach the tribological coating. The worm steel is hardened and topographically enhanced as noted above. The topographically enhanced and coated worm would minimize debris formation by minimizing adhesive tooth wear between the worm and worm gear and/or abrasive tooth wear of the worm gear while promoting low tooth mesh frictional losses. The tribological coating would have a top functional layer comprised of nanocrystalline metal carbides such as tungsten, titanium, and chromium to name a few dispersed in an amorphous hydrogenated carbon matrix. The surface texturing of the worm is performed before the worm has been coated with the tribological coating.

Yet another approach to improve seal performance would be to employ a tribological coating on the shaft or a shaft sleeve where the seal rides (seal counter-face). A shaft sleeve is a separate hollow cylinder piece that is placed on the outside diameter of the shaft. It will be understood that, throughout when a shaft is referred to, this will also encompass the use of a shaft sleeve in conjunction with the shaft. This approach adds to the first or second approach, the use of the coating on the input and/or output shafts. The tribological coating for the shaft or shaft sleeve would be comprised of a material that is chemically compatible with the elastomeric seal such that seal wear and heat generation is reduced at the shaft-to-seal interface therefore reducing seal leakage and extending seal life. The tribological coating would have a thin solid functional layer comprised of primarily chromium and nitrogen elements in a dense microstructure. The shaft is typically plunge ground to less than or equal to 20 microinch arithmetical average surface roughness or Ra without a continuous helical pattern (lead) or directionality prior to coating.

The surface texture of the worm gear can be enhanced as well. As with the worm spiral, enhancement of the worm gear can be accomplished by vibratory processing, peening, hard turning, honing, rolling and combinations thereof.

Thus the gear teeth may receive one treatment and the seal counter-face surface may receive a different treatment.

Four different approaches are outlined above: (1) the use of a hardened steel worm with a bronze worm gear; (2) the use of a hardened steel worm and a bronze worm gear with a tribological coating on one or both of the worm thread or spiral and the gear teeth; 3) the use of a hardened steel worm and a bronze worm gear with a tribological coating on one or both of the input or output shaft or shaft sleeves; or (4) the use of a hardened steel worm with a bronze worm gear with a tribological coating applied to the worm thread, the gear teeth, the input and output shafts or shaft sleeves, or combinations thereof. In each of the approaches, the worm, worm gear, and input and output shafts can have surface finishing treatments. Additionally, in each of the approaches, carbon or carbon/nitrogen concentration gradients can be added to the worm. As can be appreciated, each approach builds on the prior approach to further improve seal performance, thereby reducing seal leakage and extending seal life.

The method of the present invention will allow a designer to combine gear teeth and seal counter-face material, multiple surface finishes, and multiple coating enhancements to improve worm gear seal system performance and provide longer, leak-free seal life. The gear tooth material and surface treatments eliminate seal counter-face wear from internally generated bronze debris from the gear teeth. Seal counter-face treatments, which may be different than the gear tooth surface treatments, eliminate seal counter-face wear from external debris and reduces frictional heat. This system's synergistic approach allows one to achieve optimum performance results at a lower life cycle cost when compared to using stand-alone seal solutions.

As various changes could be made in the above constructions without departing from the scope of the invention, it is intended that all matter contained in the above description or shown in the accompanying drawings shall be interpreted as illustrative and not in a limiting sense.

The invention claimed is:

1. A method for improving the attributes of one or more seals of a worm gear assembly; the worm gear assembly comprising a worm having a worm shaft and a spiral thread; a worm gear having worm gear teeth; and a gear shaft extending from the center of the worm gear; the worm spiral thread and the worm gear being contained within a housing, and the worm shaft and gear shaft extending from the housing through openings in the housing; bearings supporting the worm and gear shafts and said seals, said seals surrounding the worm shaft and gear shaft and being positioned at the openings in the housing through which the worm shaft and gear shaft extend; the method comprising:

reducing debris formation in the worm gear speed reducer assembly caused by adhesive and/or abrasive wear of the worm and worm gear during operation of the worm gear speed reducer assembly; said step of reducing debris formation comprising:

supplying said worm wherein said worm is made from a hardened steel; wherein the worm was hardened by heating the worm to produce at least some austenite, quenching the worm and tempering worm;

supplying said gear wherein said gear is made from a bronze; and concurrently developing nitrogen and carbon concentration gradients within the worm by gaseous nitrocarburizing, vacuum nitrocarburizing, ion nitrocarburizing or salt bath nitrocarburizing; and imparting a coating on one or both of the worm spiral thread and worm gear teeth.

2. The method in claim 1 and including a step of imparting a surface finish to the shaft or a shaft sleeve of the worm and/or the gear by vibratory processing, hard turning, honing, rolling, or combinations thereof.

3. The method of claim 2 including imparting a surface finish on one or both of the worm spiral thread and worm gear teeth; the step of imparting a surface finish is performed by vibratory processing, hard turning, honing, rolling, or combinations thereof; wherein the tooth surface finish comprises less than 8 microinch surface roughness (Ra).

4. The method of claim 2 further comprising imparting a surface finish to an area of the shaft or shaft sleeve of the worm or gear contacted by the seal; the surface finish imparted to the shaft or shaft sleeve comprising less than or equal to 20 microinch arithmetical average surface roughness (Ra) without any lead.

5. The method of claim 2 wherein the coating is applied to the area contacted by the seal on the worm and/or gear shaft or shaft sleeve.

6. A method for improving the attributes of one or more seals of a worm gear assembly; the worm gear assembly comprising a worm having a worm shaft and a spiral thread; a worm gear having worm gear teeth; and a gear shaft extending from the center of the worm gear; the worm spiral thread and the worm gear being contained within a housing, and the worm shaft and gear shaft extending from the housing through openings in the housing; bearings supporting the worm and gear shafts and said seals, said seals surrounding the worm shaft and gear shaft and being positioned at the openings in the housing through which the worm shaft and gear shaft extend; the method comprising:

reducing debris formation in the worm gear speed reducer assembly caused by adhesive and/or abrasive wear of the worm and worm gear during operation of the worm gear speed reducer assembly; said step of reducing debris formation comprising:

supplying said worm wherein said worm is made from a hardened steel;

supplying said gear wherein said gear is made from a bronze; and imparting a coating on one or both of the worm spiral thread and worm gear teeth;

imparting a surface finish to the shaft or a shaft sleeve of the worm and/or the gear by vibratory processing, hard turning, honing, rolling, or combinations thereof; the surface finish of the area of the shaft or shaft sleeve of either the worm or gear contacted by the seal comprising less than or equal to 20 microinch arithmetical average surface roughness (Ra) without any lead.

7. The method in claim 6 wherein the step of reducing debris formation includes a step of developing a carbon concentration gradient within the worm by gaseous carburizing, vacuum carburizing, ion carburizing, or pack carburizing.

8. The method of claim 6 wherein the step of reducing debris formation includes a step of developing a nitrogen concentration gradient within the worm using gaseous nitriding, vacuum nitriding, ion nitriding, or salt bath nitriding.

9. The method of claim 6 wherein the step of reducing debris formation includes a step of concurrently developing nitrogen and carbon concentration gradients within the worm by gaseous nitrocarburizing, vacuum nitrocarburizing, ion nitrocarburizing or salt bath nitrocarburizing.

10. The method in claim 6 wherein the step of reducing debris formation includes a step of concurrently developing carbon and nitrogen concentration gradients within the worm by gaseous carbonitriding, vacuum carbonitriding, ion carbonitriding, or pack carbonitriding.

11. The method of claim 6 wherein the worm is hardened by heating the worm to produce at least some austenite, quenching the worm and tempering the worm.

12. The method of claim 11 wherein the step of heating the worm comprises heating the worm in a furnace or by a laser, electron beam, magnetic induction, visible light, or combinations thereof; and, the step of quenching being performed in a hydrocarbon based or aqueous based liquid, or in air, or in partial vacuum or in a gas.

13. A method for improving the attributes of one or more seals of a worm gear assembly; the worm gear assembly comprising a worm having a worm shaft and a spiral thread; a worm gear having worm gear teeth; and a gear shaft extending from the center of the worm gear; the worm spiral thread and the worm gear being contained within a housing, and the worm shaft and gear shaft extending from the housing through openings in the housing; bearings supporting the worm and gear shafts and said seals, said seals surrounding the worm shaft and gear shaft and being positioned at the openings in the housing through which the worm shaft and gear shaft extend; the method comprising:
reducing debris formation in the worm gear speed reducer assembly caused by adhesive and/or abrasive wear of the worm and worm gear during operation of the worm gear speed reducer assembly; said step of reducing debris formation comprising:
supplying said worm wherein said worm is made from a hardened steel;
supplying said gear wherein said gear is made from a bronze; and
imparting a coating on the worm and/or gear shaft or shaft sleeve; the coating being applied to the area of the worm shaft or gear shaft contacted by the seal; the coating applied to the shaft and/or shaft sleeve of the worm and/or gear comprising a thin solid top functional layer comprised of primarily chromium and nitrogen elements in a dense microstructure;
imparting a surface finish to the shaft or a shaft sleeve of the worm and/or the gear by vibratory processing, hard turning, honing, rolling, or combinations thereof.

14. The method in claim 13 including a step of developing a carbon concentration gradient within the worm by gaseous carburizing, vacuum carburizing, ion carburizing, or pack carburizing.

15. The method in claim 13 wherein the reducing step also includes a step of imparting a surface finish to the worm spiral thread and/or the gear teeth; the step of imparting the surface finish being performed by vibratory processing, hard turning, honing, rolling, or combinations thereof.

16. The method of claim 15 wherein the surface finish applied to the gear teeth has less than about 8 microinch surface roughness (Ra).

17. The method in claim 13 wherein the reducing step comprises heating the worm to produce at least some austenite, quenching the worm and tempering worm.

18. The method in claim 17 including a step of concurrently developing carbon and nitrogen concentration gradients within the worm by gaseous carbonitriding, vacuum carbonitriding, ion carbonitriding, or pack carbonitriding.

19. The method of claim 13 wherein the step of applying a coating comprises applying a coating comprised of a top functional layer comprised of nanocrystalline metal carbides dispersed in an amorphous hydrogenated carbon matrix.

20. The method of claim 19 including a step of imparting a surface finish to the worm spiral thread and/or the gear teeth; wherein the surface finish is applied before the coating is applied to the worm spiral thread and/or the gear teeth.

21. A method for improving the attributes of one or more seals of a worm gear assembly; the worm gear assembly comprising a worm having a worm shaft and a spiral thread; a worm gear having worm gear teeth; and a gear shaft extending from the center of the worm gear; the worm spiral thread and the worm gear being contained within a housing, and the worm shaft and gear shaft extending from the housing through openings in the housing; bearings supporting the worm and gear shafts and said seals, said seals surrounding the worm shaft and gear shaft and being positioned at the openings in the housing through which the worm shaft and gear shaft extend; the method comprising:
reducing debris formation in the worm gear speed reducer assembly caused by adhesive and/or abrasive wear of the worm and worm gear during operation of the worm gear speed reducer assembly; said step of reducing debris formation comprising:
supplying said worm wherein said worm is made from a hardened steel;
supplying said gear wherein said gear is made from a bronze; and
imparting a coating on the worm and/or gear shaft or shaft sleeve;
imparting a surface finish to the shaft or a shaft sleeve of the worm and/or the gear by vibratory processing, hard turning, honing, rolling, or combinations thereof; the surface finish being applied before the coating is applied to the shaft and/or shaft sleeve of the worm or gear and/or to the gear teeth.

22. A method for improving the attributes of one or more seals of a worm gear assembly; the worm gear assembly comprising a worm having a worm shaft and a spiral thread; a worm gear having worm gear teeth; and a gear shaft extending from the center of the worm gear; the worm spiral thread and the worm gear being contained within a housing, and the worm shaft and gear shaft extending from the housing through openings in the housing; bearings supporting the worm and gear shafts and said seals, said seals surrounding the worm shaft and gear shaft and being positioned at the openings in the housing through which the worm shaft and gear shaft extend; the method comprising:

reducing debris formation in the worm gear speed reducer assembly caused by adhesive and/or abrasive wear of the worm and worm gear during operation of the worm gear speed reducer assembly; said step of reducing debris formation comprising:

supplying said worm wherein said worm is made from a hardened steel; wherein the worm was hardened by heating the worm to produce at least some austenite, quenching the worm and tempering worm;

supplying said gear wherein said gear is made from a bronze; and developing a nitrogen concentration gradient within the worm using gaseous nitriding, vacuum nitriding, ion nitriding, or salt bath nitriding; and imparting a coating on one or both of the worm spiral thread and worm gear teeth.

23. The method of claim 22 wherein the worm has at least 50% austenite in the steel.

24. The method of claim 22 wherein the worm has a surface hardness of about 50 HRC to about 60 HRC.

25. The method of claim 22 wherein the worm harness decreases radially inwardly from the surface to a harness of about 30 HRC.

26. The method of claim 7 wherein the carbon concentration being greatest at the surface and decreasing inwardly from the surface.

27. The method of claim 26 wherein the worm has a carbon concentration of about 0.7 wt% at the surface, said concentration decreasing to about 0.2 wt%.

28. The method of claim 26 wherein the worm gear assembly also has a nitrogen gradient.

29. The method of claim 22 including a step of applying a tribological coating to one or more of the worm spiral, gear teeth, worm shaft and gear shaft.

30. The method of claim 29 wherein the tribological coating applied to the worm spiral and/or gear teeth has a top functional layer comprised of nanocrystalline metal carbides dispersed in an amorphous hydrogenated carbon matrix.

31. The method of claim 29 wherein the tribological coating applied to the worm shaft and/or gear shaft comprises a thin solid functional layer comprised of primarily chromium and nitrogen elements in a dense microstructure.

32. The method of claim 29 wherein the tribological coating applied to the worm spiral and/or gear teeth has a top functional layer comprised of nanocrystalline metal carbides dispersed in an amorphous hydrogenated carbon matrix.

* * * * *

UNITED STATES PATENT AND TRADEMARK OFFICE
CERTIFICATE OF CORRECTION

PATENT NO. : 7,662,240 B2 Page 1 of 1
APPLICATION NO. : 10/874100
DATED : February 16, 2010
INVENTOR(S) : Bishop et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this

Twenty-eighth Day of December, 2010

David J. Kappos
*Director of the United States Patent and Trademark Office*